Aug. 12, 1958 W. NAGORSKI 2,847,495
VOLTAIC CELLS

Filed July 18, 1955 2 Sheets-Sheet 1

INVENTOR
Witold Nagorski
BY
ATTORNEY

Aug. 12, 1958 — W. NAGORSKI — 2,847,495
VOLTAIC CELLS
Filed July 18, 1955 — 2 Sheets-Sheet 2
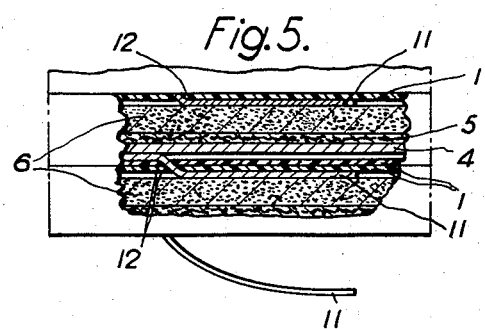
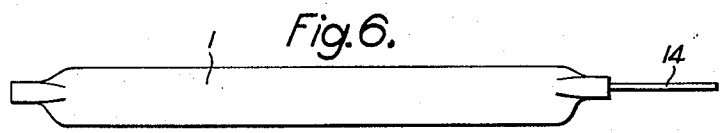
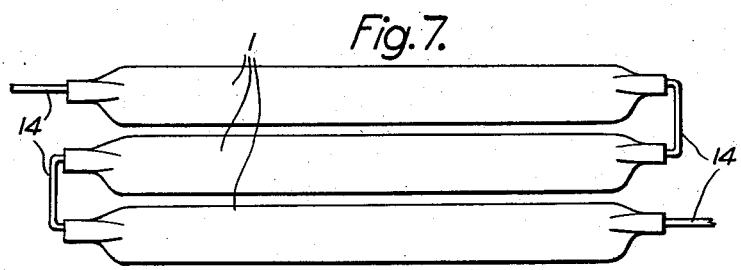
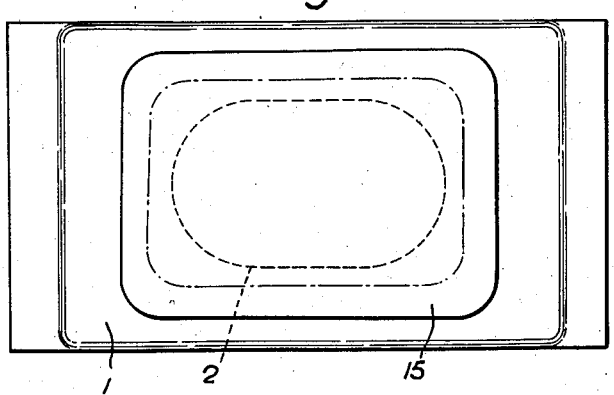
INVENTOR
Witold Nagorski
BY
ATTORNEY

2,847,495
Patented Aug. 12, 1958

United States Patent Office

2,847,495
VOLTAIC CELLS

Witold Nagorski, Whitley Bay, Northumberland, England, assignor to Burndept Limited, London, England, a British company Application July 18, 1955, Serial No. 522,625

Claims priority, application Great Britain July 21, 1954

1 Claim. (Cl. 136—111)

This invention relates to the construction of voltaic batteries of the layer type, that is to say batteries of which the several cells are built up from flat elements.

Although the electrolyte of layer type cells is initially immobilised, as by absorption in bibulous material and/or by gelling, free liquid is likely to appear when a cell is used, or even during its shelf life. It is important to prevent escape of such liquid; it must not escape from the battery because of its corrosive effect on surrounding apparatus and because the loss of it will render the cell less efficient; and it must not escape from cell to cell within the battery, otherwise one or more cells will be short-circuited and the battery will speedily become useless.

The problem of sealing layer type cells is therefore a familiar one to battery makers, and very many endeavours have been made to solve it. The problem is rendered the more difficult by the fact that hydrogen and other gases are generated in the cell by chemical action and unless these can be dispersed they will give rise to high internal pressures. In addition liquid may be formed from the gases and certain of the cell elements may increase in volume thus increasing the substantially incompressible contents of the cell and finally the cell may even burst.

One method of sealing cells on which much effort has been spent is to wrap the assembled cell components in sheet insulating material, much as a parcel is wrapped in paper. The operation is not so simple as wrapping a parcel for an opening must be left in the wrapping on each side of the cell in order that electrical contact may be established between the cell and its neighbours. At the corners of the cell, assuming it to be of generally rectangular shape, there is an excess of wrapping material on the side on which the wrapping sheet is folded over the cell, and this must be disposed of in pleats; these prevent the cell presenting an entirely smooth surface to its neighbour, and so make likely interstices in the seal through which liquid may escape. To allow for this the common practice is to round the corners of the flat elements of the cell. Because the battery generally has to be accommodated in a rectangular space, this rounding of the corners wastes a substantial proportion of the available space and the battery does not incorporate maximum energy for the volume reserved for it.

In a modification of this method the assembled cell components are not wrapped like a parcel by placing them in a pile on a sheet of wrapping material and folding the wrapping material around the edges and over the top of the pile, but instead a band of insulating material such as polyvinyl chloride is wound around the edges of the pile and the edges of the band are folded inward both above and below the pile of components. But this modification does not eliminate, indeed it increases, the difficulty of dealing with excess material at the corners, and not much success was obtainable until the corners of the flat elements were rounded off to relatively large radius in plan and also rounded in longitudinal section, resulting in a substantial reduction of effective volume. Notwithstanding the rounding of the corners in both the above prior schemes, some pleating or puckering of the wrapping occurs and when the depolarising mix is at one end of the wrapped unit the end pressure which is applied when the units are assembled into a battery forces the wrapping material into the mix and tends to damage it.

The present invention uses polyvinylchloride or another plastic which has the properties of flexibility and elasticity, of being a dielectric, of withstanding the action of the electrolyte in the presence of the remaining cell components, and the very useful property of being penetrable by hydrogen and other gases produced in the cell though impervious to electrolyte; the invention uses this material in the form of tubing. But in lieu of stretching the tube around all four edges of a rectangular assembly of layer components so that the axis of the tube is at right angles to the surface of the components, it is drawn over the assembly, or the assembly is thrust into it, in a direction parallel to the surfaces of the components, so that the axis of the tube is parallel with the layers; the tube wraps two opposite edges of the assembly, leaving the other two initially unwrapped and exposed within the tube at a short distance from its ends. These ends are subsequently sealed by welding. Provision must be made for contact between one assembly of components and its neighbour through the wrapping. Thus perforations may be made in the tube on opposite sides of the assembly to permit direct contact when the assemblies are stacked and pressed together. Or such perforations may be hermetically sealed by welding or glueing on a patch of electrolyte-proof conductive foil which affords electrical contact between one assembly and the next.

Another mode of establishing electrical contact between one assembly and its neighbour is to provide each assembly with a conductive tongue (separately made or struck up from or integral with the anodic metal element) which may either pass through slits in the adjacent wrappers and be a sufficiently tight fit in the slits to prevent leakage, or pass through the welds at the ends of the wrapper tubes, the welds again insuring a liquid-tight joint round the tongue.

Such a wrapping presents a smooth surface on both sides of the assembly even when the assembly is strictly rectangular in plan, so that when a number of assemblies are stacked under pressure to form a battery, the wrapping does not damage the mix if it is next to the wrapping. Also if simple perforations are used to provide for contact a thorough seal is readily made by the pressure around the edge of each perforation in the tube. The cell contents are completely sealed against leakage of electrolyte either from one cell into the next or out of the battery, while hydrogen and other gases can diffuse through the wrapping.

Another especially valuable feature of the invention is that free spaces or pockets are formed between the sealed edges of the tubes and the assembly of components, and by folding over these pockets may be flattened. Under rising internal pressure these pockets can allow for a considerable accumulation of gases or liquid at times of heavy load or difficult conditions in storage. If they have been folded over they will unfold and expand when thus called into use. This breathing effect allows the assembly to come through such difficult periods without much increase in pressure and the accumulated gas will slowly diffuse away. This feature is especially important if the assembly starts to produce more liquid than the free internal volume will accommodate. Liquids are substantially incompressible but the pockets by accommodating the liquid can save the battery from leaking or bursting.

The invention is illustrated in the accompanying drawings in which

Figure 1:
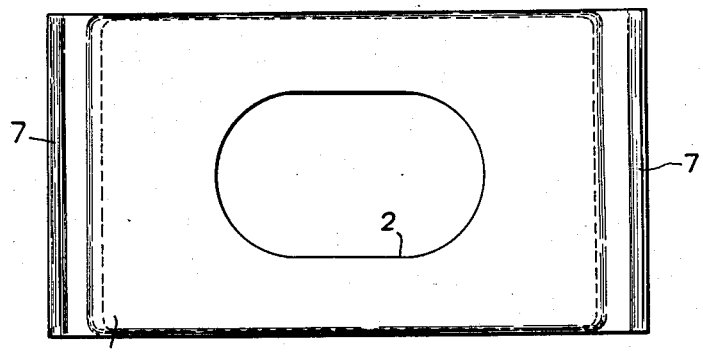
Figure 1 is a plan of one unit of a battery.

Figure 5 a side elevation showing another form of unit in which conductive tongues are used, Figure 6 is a side elevation of yet another form of unit in which a tongue protruding through the weld is used, Figure 7 is a side view of several of the units of Fig. 6 in assembled relationship, Figure 8 is a plan view of yet another form of unit.

A long length of tubing of polyvinylchloride or like plastic is readily made by the usual method of extrusion or by folding a strip and welding along the edges. For the purpose of this invention the material of the tube needs to become readily flexible and capable of substantial stretch when moderately heated, say by steam. The extruded tube may be wound flat upon a storage roll from which it is drawn as required for battery manufacture. For the form of the invention shown in Figures 1 to 3 it is punched at intervals somewhat greater than the length of a cell so as to have on each side a perforation or opening and is severed between these openings. In this way there is produced a short length of tube 1 shown in Figs. 1 and 2, with an opening 2 on each side of it. Into this tube is thrust an assembled pile of cell components all of which are flat. In the example illustrated these components are: a sheet 3 of conductive plastic to serve as a current collector, a plate of metal, usually of zinc, 4 constituting the anode of a cell, a sheet of bibulous paper 5 with its edges upturned, and a cake of mix 6, that is to say of depolariser mixed with carbon for conductivity, this mix constituting the cathode of a cell. The bibulous sheet 5 is impregnated with electrolyte.

It may be thought convenient to call this assembly of components a unit rather than a cell, for the current collector 1 is needed to gather current from the poorly conducting mix 6, so that a complete cell is best regarded as consisting of current collector, mix, electrolyte, and anodic metal in that order. The components could be placed in that order in the plastic tube but the arrangement shown is preferred.

The tube section is cut of sufficient length to protrude beyond the ends of the pile of components to the extent necessary to permit of its ends being closed by pressure and sealed by welding, for instance by the aid of a high frequency electrostatic field. These sealed ends plainly appear at 7 in Figures 1 and 2.

It should be remarked that the thickness of the several layers of which the unit is built up, and the thickness of the plastic tube are of necessity much exaggerated, so the drawing is not to be regarded as a precise guide to dimensions. The thickness of the component layers is determined mainly by electrochemical considerations, as well known to battery makers and the thickness of the plastic tube mainly by considerations of mechanical strength. Similarly the extent to which the ends of the tube project beyond the pile of components is not to the scale of the components. The extent is made such as to form a pocket adquate for the volume of gases and liquid it is thought desirable to provide for.

Figure 3:
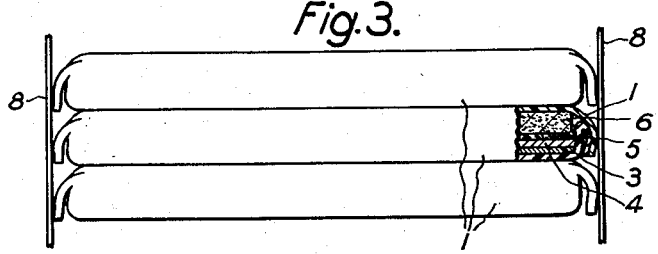
Figure 3 depicts part of a battery built up from such units.

The extent of projection of the welded ends of the tube can be reduced by folding them towards the body of the unit as shown in Fig. 3, and this is very readily done in the course of assembling a number of units into a battery. For the pile of units needs to be maintained under pressure in order that there may be good contact between the components of a unit and between the current collect in one unit and the mix in the next.

To apply this pressure the battery may be held for example in a frame indicated at 8 in Fig. 3. It will be understood that this frame does not extend over the whole width of the stack, so that if the pockets have to expand to accommodate gases or liquids they can do so on either side of the frame member.

Figure 4:
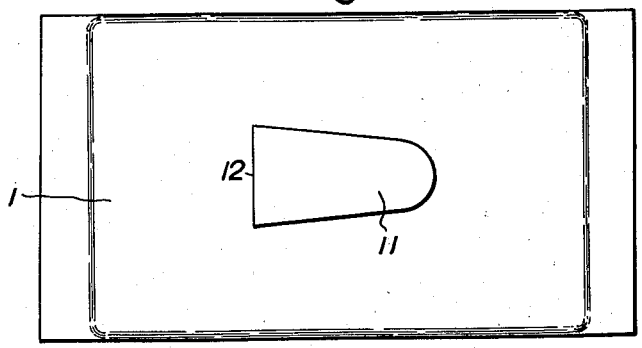
Figure 4 is a plan view.

Figs. 4 and 5 show a construction according to the invention in which the connection between one assembly and the next is made by a conductive tongue 11 which may be a separate piece of conductive foil or may be struck up in suitable cases from the anodic metal. When the assembled elements are inserted into the plastic tube the tongue is passed through a slit 12 which is sufficiently smaller than the cross section of the tongue for the material of the tube, having regard to its elasticity and the manipulation which it receives, to make a tight joint round the tongue, while when the assemblies or units are stacked, the protruding tongue of each is passed through the corresponding slit in the next assembly as indicated in Fig. 5. The tongue should be made of or protected by any known electrolyte-proof conductive material such as graphite-loaded polyvinyl chloride.

Figs. 6 and 7 show another construction which uses connecting tongues 14 but here they protrude through one welded end of the plastic tube, the plastic becomes sealed to the tongue. When the stack is assembled the protruding tongues are bent over and passed through the welded end of the neighbouring assembly and sealed therein as indicated in Fig. 7. In this case it may be more convenient to weld one end of the tube after the assembled elements have been inserted and to weld the other end after the stack has been assembled. The tongue will be made of or protected by electrolyte-proof conductive material.

Figure 2:
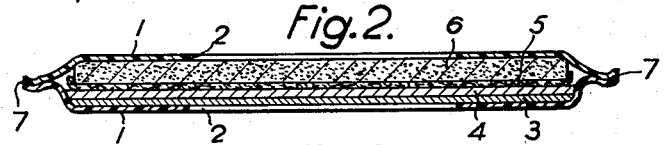
Figure 2 is an elevation of it in section on a median plane.

In the construction shown in Fig. 8 a plastic tube 1 with perforations or openings 2 as in Fig. 1 is used but each opening is covered by a welded-on or glued-on patch 15 of conductive foil which, at least when the unit is under end pressure, makes contact through the opening with the end element of the assembly within. When such units are stacked the neighbouring conductive patches make direct electrical contact. This construction has the advantage that each unit is hermetic apart from the penetrability of the plastic cover by gases; nevertheless electrical connection with the assembly is easily and directly made. To facilitate the attachment of the patches, a flat strip of plastic may be punched with two rows of openings side by side at the appropriate spacing or two strips punched each with a row of openings, and the patches then be welded or glued on. In the case of a single strip this would then be folded and welded along the edges to complete it into a tube or in the case of two strips they would be superposed and welded along both edges. In either case a tube with the patches already in position is produced. The patches of Fig. 8 may be of the same material as above specified for making or protecting the conductive tongues of Figs. 4 to 7.

I claim:

A unit for an electric dry battery of the layer type, consisting of the electrical components of a cell, all of flat form and substantially rectangular shape, assembled in register, and a seamless tube of an elastic plastic material which is dielectric and resists the electrolyte but permits the diffusion of gases produced in the cell tightly enclosing said components, the axis of said tube being parallel with the flat faces of the components and the ends of the tube sealed by welding so as to leave pockets adapted to accommodate gases and/or liquid produced in the storage and operation of the cell, and a conductive tongue electrically connected with one end component and protruding through one welded end of the tube, the weld being sealed to the tongue.

References Cited in the file of this patent

UNITED STATES PATENTS

| | | |
|---|---|---|
| 2,478,632 | Lockwood et al. | Aug. 9, 1949 |
| 2,627,534 | Arbogast | Feb. 3, 1953 |
| 2,635,128 | Arbogast | Apr. 14, 1953 |
| 2,666,802 | Woodring et al. | Jan. 19, 1954 |